8200X
L. Conley,
Wind Wheel,
Patented May 15, 1834.
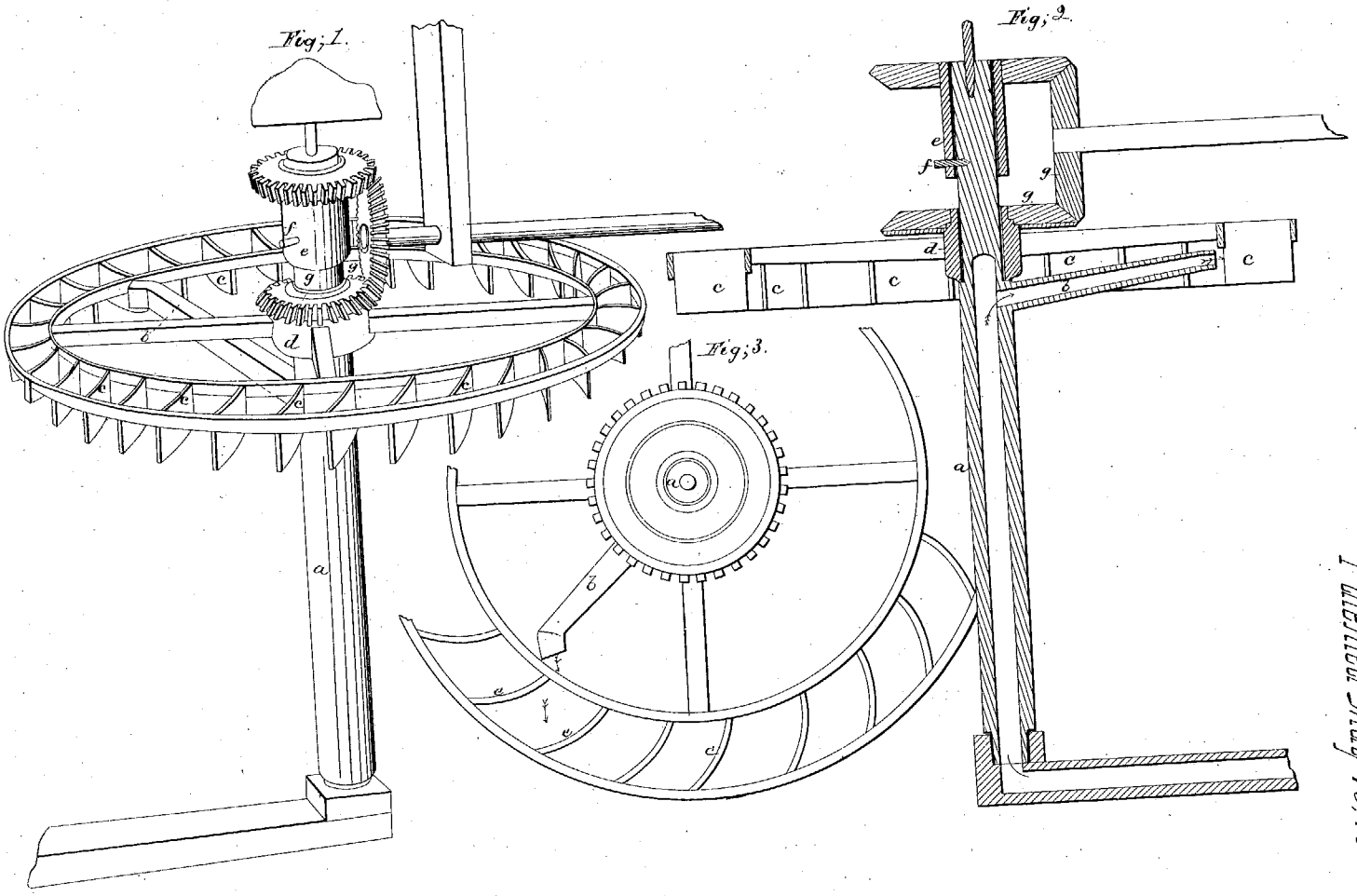
N. PETERS, PHOTO-LITHOGRAPHER, WASHINGTON, D. C.

Luther Copley, of New Lebanon, N.Y.
Letters Patent.

The schedule referred to, in these Letters Patent, and making part of the
same, containing a description in the words of the said Luther Copley
himself, of his improvement in the construction of a mill or machine wheel,
and the application of water, wind, or Steam thereto, as the propelling power -

Specification of the improvement, of Luther Copley, one of the United
Society commonly called Shakers, of the Town of New Lebanon, in the
County of Columbia, and State of New York, in the construction of a mill
or machine wheel and the application of water, wind or steam, thereto as
the propelling power, by which the same power is used thrice, and a treble
power obtained - The following is the method of its construction and appli-
-cation of either of the powers above mentioned - An upright shaft is made
tubular at the lower end, permitting either water wind or steam to enter
at the centre of the gudgeon, and passing up the shaft to a square tube
firmly fixed at right angles in the main shaft - This latter tube is made
to any required size and in length equal to the inner periphery of the
wheel or floats - The power used is made to escape latterally at the end of
this tube, by means of an elongated aperture or mouth, so as at the instant
it so escapes, the power strikes the pendant or wing floats on the main
wheel - The main wheel may be constructed, in the ordinary way, with
the exception of the floats, and to any required strength or dimension -
The floats are placed pendant under the outer periphery of the wheel also
made to any required size - The faces to which the power is applied, are
constructed so far curvilinear, as to have the angle of resistance, of the
moving power always the same, until its final escape from the outer edg-
-es of the floats this wheel when so constructed is secured firmly, to a cy-
-lindrical or hollow shaft and placed around the first described or
inner shaft, or it may be attached to the inner shaft, with a suitable
collar or necking, to keep the two shafts and the main wheel and tu-
-bular arm all in their proper positions and relations - When the two shafts so constructed and put together, and the power applied as above described the outer shaft will have a counter direction to the inner shaft, or one shaft will turn to the right and the other shaft to the left. These two opposite motions are united or concentrated as follows: another detached hollow or cylindrical shaft, is placed round the upper end of the inner shaft and secured to it, by inserting a steady pin, passing through the centre of the outer & inner shafts, two pinion wheels of equal diameters are then placed on and secured, one below on the outer lower shaft and the other above at such a distance as will permit a rack to mesh between and in both the pinions. This gearing concentrates and combines the forces of the two opposite motions, and without which the force or power of one of the opposite motions, would be entirely lost. The invention and improvement which the said Luther Copley herein claims, is the construction and application of the main wheel with pendant or wing floats, the construction & application of the two shafts as above described; the concentration of the two opposite forces, and the two fold or double use of the same power or momentum, whereby twice the amount of power is obtained from the same or any given momentum. In the construction and adaptation of the above described invention and improvements, the ordinary materials, wood or metal may be used, or both combined, at the will or choice of the builder: The size and dimensions in all respects, calculated and determined by the amount of power required, to perform the intended business —

In testimony whereof, and in conformity with the laws of the Congress of the United States of America I have hereunto subscribed my name in the presence of two subscribing witnesses — at the City of Albany this 29th day of April A.D. 1834.

Witnesses
J. C. Cole
W. W. C. Dougherty

Luther Copley

Exd.
W.G.C.

[illegible]28 [illegible]